(12) United States Patent
Saito et al.

(10) Patent No.: US 11,843,233 B2
(45) Date of Patent: Dec. 12, 2023

(54) WIRE HARNESS

(71) Applicant: SUMITOMO WIRING SYSTEMS, LTD., Yokkaichi (JP)

(72) Inventors: Ryuta Saito, Yokkaichi (JP); Katsutoshi Izawa, Yokkaichi (JP); Kosuke Tanaka, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 17/959,845

(22) Filed: Oct. 4, 2022

(65) Prior Publication Data
US 2023/0126857 A1 Apr. 27, 2023

(30) Foreign Application Priority Data
Oct. 22, 2021 (JP) ................................. 2021-173226

(51) Int. Cl.
*H02G 3/04* (2006.01)
*B60R 16/02* (2006.01)
*H01B 7/00* (2006.01)

(52) U.S. Cl.
CPC ......... *H02G 3/0418* (2013.01); *H01B 7/0045* (2013.01); *H02G 3/0468* (2013.01); *B60R 16/0215* (2013.01)

(58) Field of Classification Search
CPC ............ B60R 16/0207; B60R 16/0215; H02G 3/0418; H02G 3/0468; H02G 3/0481; H02G 3/32; H01B 7/0045; H01B 17/32; H01B 17/38; H01B 17/58
See application file for complete search history.

(56) References Cited

U.S. PATENT DOCUMENTS

| | | | | |
|---|---|---|---|---|
| 2,408,253 | A * | 9/1946 | Diebold | H02G 7/00 174/136 |
| 4,258,515 | A * | 3/1981 | Owen | H02G 3/04 138/104 |
| 4,563,542 | A * | 1/1986 | Pollack | H02G 3/266 174/68.3 |
| 2014/0196929 | A1 | 7/2014 | Okuhara | |
| 2015/0377387 | A1* | 12/2015 | Meyers | F16L 3/22 425/130 |
| 2016/0109039 | A1* | 4/2016 | Munsch | H02G 3/0487 248/49 |
| 2016/0248236 | A1* | 8/2016 | Kaneko | H02G 3/0487 |

FOREIGN PATENT DOCUMENTS

| | | | |
|---|---|---|---|
| JP | S4726000 U * | 11/1972 | ............. H01B 17/58 |
| JP | 2013-055760 A | 3/2013 | |

* cited by examiner

*Primary Examiner* — Paresh Paghadal
(74) *Attorney, Agent, or Firm* — Oliff PLC

(57) ABSTRACT

A wire harness including: a wire harness main body including an electric wire and an exterior tube enclosing an outer circumference of the electric wire; a first path restricting cover that is attached to an outer circumference of the exterior tube and restricts a path of the wire harness main body; and a second path restricting cover that is attached to an outer circumference of the first path restricting cover and restricts the path of the wire harness main body.

6 Claims, 8 Drawing Sheets

WIRE HARNESS

BACKGROUND

The present disclosure relates to a wire harness.

Conventionally, a wire harness that includes: a wire harness main body that includes an electric wire member and an exterior member that covers the electric wire member; and a path restricting member that is attached to an outer circumference of the exterior member and is configured to restrict the path of the wire harness main body, has been known as a wire harness for a vehicle (see, for example, JP 2013-55760A).

SUMMARY

In the above-described wire harness, if the specifications of, for example, the routing path of the wire harness are changed, the length of the section of the path that needs to be restricted by the path restricting member may also change. In that case, it is necessary to redesign the path restricting member according to the change in the length of the path restriction section.

An exemplary aspect of the disclosure provides a wire harness capable of easily accommodating changes in the specifications.

A wire harness of the present disclosure includes: a wire harness main body including an electric wire and an exterior tube enclosing an outer circumference of the electric wire; a first path restricting cover that is attached to an outer circumference of the exterior tube and restricts a path of the wire harness main body; and a second path restricting cover that is attached to an outer circumference of the first path restricting cover and restricts the path of the wire harness main body, wherein: the second path restricting cover covers the outer circumference of a portion in a lengthwise direction of the first path restricting cover, and covers the outer circumference of the exterior tube that is displaced from the first path restricting cover in a lengthwise direction of the wire harness main body and is exposed from the first path restricting cover, the first path restricting cover includes a first main body that covers a portion of the outer circumference of the exterior tube, and a first insertion port that is open in a direction orthogonal to a lengthwise direction of the first main body and extends along an entire length in the lengthwise direction of the first main body, the second path restricting cover includes a second main body that covers a portion of the outer circumference of the first path restricting cover and a portion of the outer circumference of the exterior tube, and a second insertion port that is open in a direction orthogonal to a lengthwise direction of the second main body and extends along an entire length in the lengthwise direction of the second main body, and the second path restricting cover is configured to slide along the outer circumference of the first path restricting cover in the lengthwise direction of the wire harness main body.

The wire harness of the present disclosure provides the effect of easily accommodating changes in the specifications.

DETAILED DESCRIPTION OF EMBODIMENTS

Description of Embodiments of Present Disclosure

Figure 1:
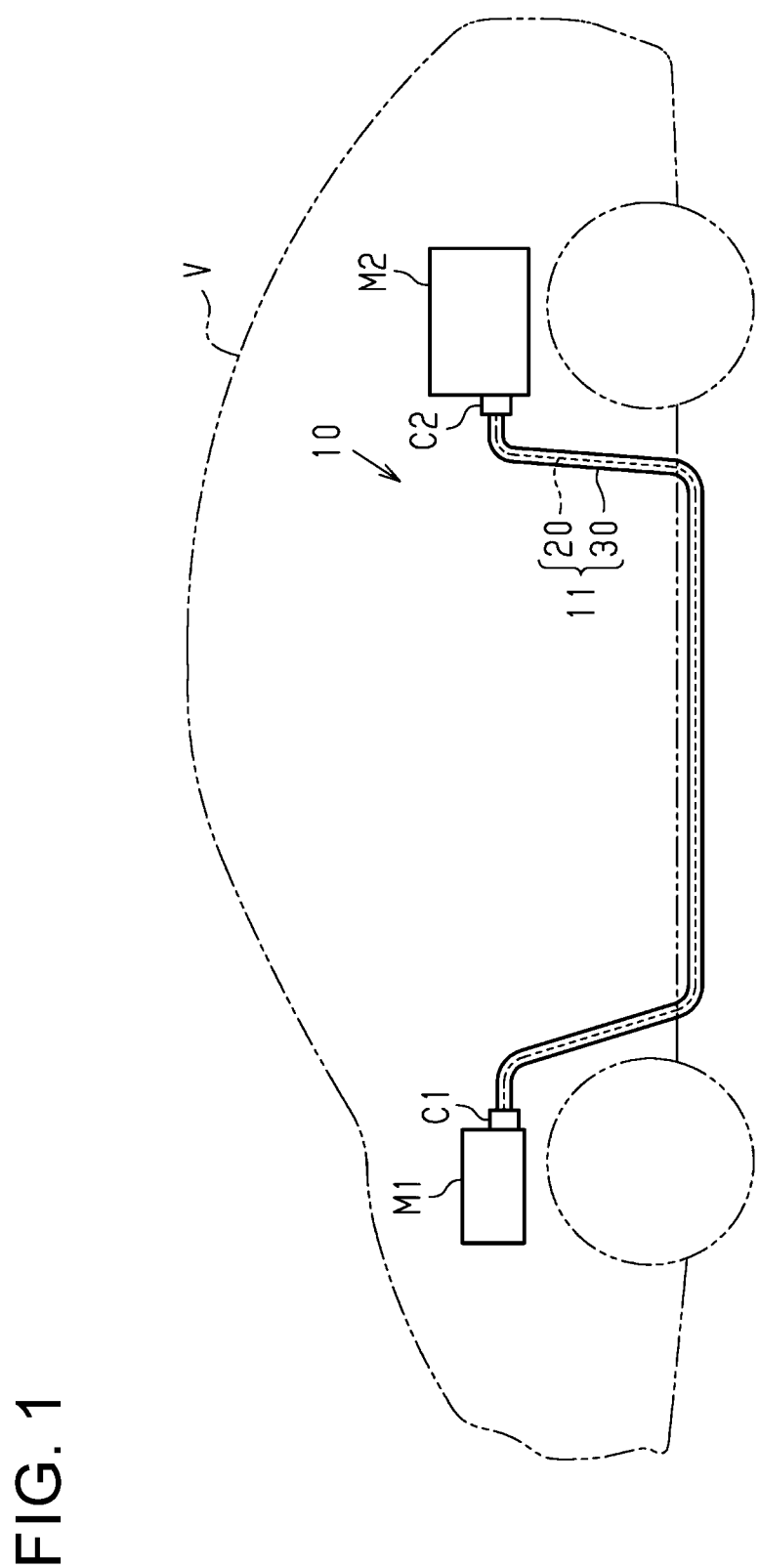
FIG. 1 is a schematic configuration diagram showing a wire harness according to an embodiment.

First, embodiments of the present disclosure will be listed and described.

[1] A wire harness of the present disclosure includes: a wire harness main body including an electric wire member and an exterior member enclosing an outer circumference of the electric wire member; a first path restricting member that is attached to an outer circumference of the exterior member and restricts a path of the wire harness main body; and a second path restricting member attached to an outer circumference of the first path restricting member and restricts the path of the wire harness main body, in which the second path restricting member covers an outer circumference of a portion in a lengthwise direction of the first path restricting member, and covers the outer circumference of the exterior member that is displaced from the first path restricting member in a lengthwise direction of the wire harness main body and is exposed from the first path restricting member, the first path restricting member includes a first main body portion that covers a portion of the outer circumference of the exterior member, and a first insertion port that is open in a direction orthogonal to a lengthwise direction of the first main body portion and extends along an entire length in the lengthwise direction of the first main body portion, the second path restricting member includes a second main body portion that covers a portion of the outer circumference of the first path restricting member and a portion of the outer circumference of the exterior member, and a second insertion port that is open in a direction orthogonal to a lengthwise direction of the second main body portion and extends along an entire length in the lengthwise direction of the second main body portion, and the second path restricting member is capable of sliding along the outer circumference of the first path restricting member in the lengthwise direction of the wire harness main body.

According to this configuration, a portion in the lengthwise direction of the first path restricting member and a portion in the lengthwise direction of the second path restricting member are provided overlapping with each other in the lengthwise direction of the wire harness main body. Moreover, the second path restricting member covers the outer circumference of a portion in the lengthwise direction of the first path restricting member, and covers the outer circumference of the exterior member that is displaced from the first path restricting member in the lengthwise direction of the wire harness main body. Furthermore, the second path restricting member is capable of sliding along the outer circumference of the first path restricting member with respect to the first path restricting member in the lengthwise direction of the wire harness main body. Due to the above features, the width of overlapping between the first path restricting member and the second path restricting member can be easily adjusted by sliding the second path restricting member with respect to the first path restricting member in the lengthwise direction of the wire harness main body. By adjusting the width of overlapping, the overall length of the first path restricting member and the second path restricting member in the lengthwise direction of the wire harness main body can be easily adjusted. That is, the length of the section in which path restriction is implemented by the first path restricting member and the second path restricting member can be easily adjusted by the adjustment of the width of overlapping between the first path restricting member and the second path restricting member. Therefore, even if the length of the path restriction section is changed due to changes in the specifications, for example, of the routing path of the wire harness main body, the change in the specifications can be easily accommodated by adjusting the width of overlapping between the first path restricting member and the second path restricting member.

[2] It is preferable that the wire harness further includes an attachment member that is provided spaced apart from the first path restricting member in the lengthwise direction of the wire harness main body and is attached to the outer circumference of the exterior member, in which the second path restricting member extends from one end portion in the lengthwise direction of the first path restricting member to the attachment member, and the second path restricting member includes a first covering portion that covers the outer circumference of the first path restricting member and a second covering portion that covers an outer circumference of the attachment member. According to this configuration, the first path restricting member is interposed between the first covering portion of the second path restricting member and the outer surface of the exterior member, and the attachment member is interposed between the second covering portion of the second path restricting member and the outer surface of the exterior member. As a result, the gap between the inner surface of the first covering portion and the outer surface of the exterior member is filled with the first path restricting member, and the gap between the inner surface of the second covering portion and the outer surface of the exterior member is filled with the attachment member. As a result, the second path restricting member can be stably attached to the outer circumference of the exterior member via the first path restricting member and the attachment member.

[3] It is preferable that the attachment member is a third path restricting member that has the same transverse cross-sectional shape as the first path restricting member. According to this configuration, the first path restricting member is interposed between the inner surface of the first covering portion and the outer surface of the exterior member, and the third path restricting member, which has the same transverse cross-sectional shape as the first path restricting member, is interposed between the inner surface of the second covering portion and the outer surface of the exterior member. As a result, components having the same structure can be interposed between the first and second covering portions and the exterior member. Therefore, the second path restricting member can be more stably attached to the outer circumference of the exterior member via the first path restricting member and the third path restricting member.

[4] It is preferable that the attachment member is shorter than the first path restricting member in the lengthwise direction of the wire harness main body. According to this configuration, the attachment member, which fills the gap between the inner surface of the second covering portion and the outer surface of the exterior member, is formed shorter than the first path restricting member. Therefore, since the attachment member can be prevented from being formed longer than necessary, it is possible to suppress an increase in the cost of material of the attachment member. As a result, an increase in the manufacturing cost of the wire harness can be suppressed.

[5] It is preferable that the wire harness further comprises a first fixing member that fixes the first covering portion of the second path restricting member to the outer circumference of the first path restricting member. According to this configuration, the first fixing member can be used to fix the first covering portion to the first path restricting member, for example, after adjusting the width of overlapping between the first path restricting member and the second path restricting member. As a result, it is possible to advantageously prevent changes in the overall length of the first path restricting member and the second path restricting member once the width of overlapping between the first path restricting member and the second path restricting member is adjusted.

[6] It is preferable that the wire harness further includes: a second fixing member that fixes, to the outer circumference of the exterior member, an end portion in the lengthwise direction of the first path restricting member that is exposed from the second path restricting member; and a third fixing member that fixes the second covering portion of the second path restricting member to the outer circumference of the exterior member. According to this configuration, the movement of the first path restricting member and the second path restricting member with respect to the exterior member is suppressed in the lengthwise direction of the wire harness main body. As such, it is possible to suppress displacement of the first path restricting member and the second path restricting member with respect to the exterior member in the lengthwise direction of the wire harness main body, and the positional accuracy of the first path restricting member and the second path restricting member with respect to the covering portion can be improved.

[7] It is preferable that the first path restricting member includes: a first end portion and a second end portion that are two end portions in a circumferential direction of the first main body portion and form the first insertion port; and a first protruding portion that protrudes from an inner surface of at least one of the first end portion and the second end portion and is able to come into contact with an outer surface of the exterior member, and the second path restricting member includes: a third end portion and a fourth end portion that are two end portions in a circumferential direction of the second main body portion and form the second insertion port; and a second protruding portion that protrudes from an inner surface of at least one of the third end portion and the fourth end portion and is able to come into contact with an outer surface of the first path restricting member. According to the configuration, the first path restricting member has a first protruding portion that protrudes from the inner surface of at least one of the first end portion and the second end portion and can come into contact with the outer surface of the exterior member. With this first protruding portion, for example, the exterior member can be pressed from the outside of the exterior member. Therefore, detachment of the first path restricting member from the exterior member through the first insertion port can be advantageously suppressed. Furthermore, the second path restricting member has a second protruding portion that protrudes from the inner surface of at least one of the third end portion and the fourth end portion and can come into contact with the outer surface of the first path restricting member. With this second protruding portion, for example, the first path restricting member can be pressed from the outside of the first path restricting member. Accordingly, detachment of the second path restricting member from the first path restricting member through the second insertion port can be advantageously suppressed.

[8] It is preferable that the second path restricting member is attached to the outer circumference of the first path restricting member such that an orientation of the second insertion port is different from an orientation of the first insertion port, the first path restricting member includes a recess recessed from an outer surface of the first main body portion, and the second protruding portion is capable of fitting in the recess through recess-protrusion fitting and is capable of engaging with the recess in a circumferential direction of the wire harness main body. According to the configuration, by recess-protrusion fitting between the recess formed in the outer surface of the first main body portion and the second protruding portion formed on the inner surface of the second main body portion, the recess is engaged with the second protruding portion in the circumferential direction of the wire harness main body. As a result, the relative movement of the second path restricting member is suppressed with respect to the first path restricting member in the circumferential direction of the wire harness main body. That is, it is possible to advantageously suppress circumferential rotation of the second path restricting member with respect to the first path restricting member.

[9] It is preferable that the second path restricting member is attached to the outer circumference of the first path restricting member such that an orientation of the second insertion port coincides with an orientation of the first insertion port, and the second protruding portion is provided in the first insertion port and is capable of coming into contact with at least one of the first end portion and the second end portion in a circumferential direction of the wire harness main body. According to this configuration, the second protruding portion of the second path restricting member is provided in the first insertion port and is capable of coming into contact with at least one of the first end portion and the second end portion, which form the first insertion port, in a circumferential direction of the wire harness main body. Therefore, the second protruding portions can be engaged with the first end portion or the second end portion in the circumferential direction of the wire harness main body. As a result, it is possible to advantageously suppress circumferential rotation of the second path restricting member with respect to the first path restricting member.

Details of Embodiments of the Present Disclosure

Specific examples of the wire harness of the present disclosure will be described below with reference to the drawings. In each drawing, for convenience of description, portions of the configuration may be exaggerated or simplified. Also, the dimensional proportion of each portion may differ in each drawing. In the present specification, "orthogonal", "parallel", and "total length" include not only the case of being strictly orthogonal, parallel, and the total length, but also the case of being approximately orthogonal, parallel, and the total length within a range in which the actions and effects off the present embodiment are exhibited.

In the present specification, "same" includes not only the case of being exactly the same, but also the case where there are some differences between the comparison targets due to the influence of dimensional tolerances and the like. Also, the term "tubular shape" used in the description of the present specification is not limited to a circumferential wall that is formed continuously all the way around, but also a tubular shape formed by combining a plurality of components, and a tubular shape having a notch or the like in a portion in the circumferential direction, as with a C shape. Note that a "tubular" shape includes, but is not limited to, a circular shape, an elliptical shape, and a polygon having sharp or rounded corners. Also, the term "ring shape" used in the description of the present specification may refer to any structure that forms a loop, or a continuous shape with no end portions, as well as a generally loop-shaped structure having a gap, such as a C shape. Note that a "ring-shaped" shape includes, but is not limited to, a circular shape, an elliptical shape, and a polygon having sharp or rounded corners. Note that the present disclosure is not limited to these examples, and is indicated by the claims, and is intended to include all modifications within the meaning and scope equivalent to the claims.

Overall Configuration of Wire Harness 10

A wire harness 10 shown in FIG. 1 is to be mounted in a vehicle V such as a hybrid vehicle or an electric vehicle, for example. The wire harness 10 electrically connects two or more on-board devices to each other. The on-board devices are electric devices mounted in the vehicle V. The wire harness 10 electrically connects, for example, an inverter M1 that is installed in a front portion of the vehicle V and a high-voltage battery M2 that is installed rearward of the inverter M1 in the vehicle V, to each other. The wire harness 10 is formed in an elongated shape so as to extend in a front-rear direction of the vehicle V, for example. The wire harness 10 is routed in the vehicle V so that, for example, an intermediate portion in the lengthwise direction of the wire harness 10 passes outside the vehicle interior such as under the floor of the vehicle V.

The inverter M1 is, for example, connected to a motor (not shown) for driving wheels, which serves as a power source when the vehicle travels. The inverter M1 generates AC power from the DC power of the high-voltage battery M2, and supplies the AC power to a motor. The high-voltage battery M2 is, for example, a battery that is capable of supplying a voltage of several hundred volts.

The wire harness 10 includes a wire harness main body 11. The wire harness main body 11 includes an electric wire member 20 (electric wire) and a tubular exterior member 30 (exterior tube) that encloses the outer circumference of the electric wire member 20. The wire harness 10 has connectors C1 and C2 that are respectively attached to two end portions of the electric wire member 20. One end portion in the lengthwise direction of the electric wire member 20 is connected to the inverter M1 via the connector C1, and the other end portion in the lengthwise direction of the electric wire member 20 is connected to the high-voltage battery M2 via the connector C2.

Figure 2:
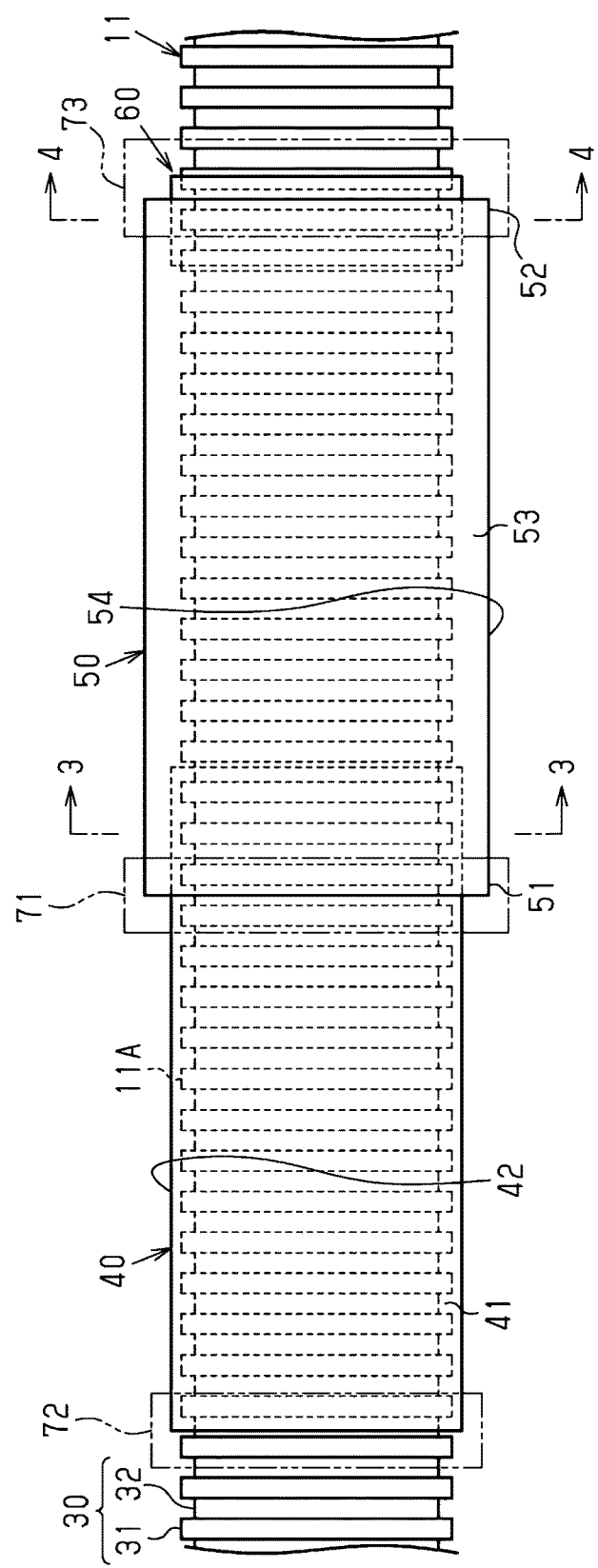
FIG. 2 is a schematic side view showing a wire harness according to an embodiment.

As shown in FIG. 2, the wire harness 10 includes a first path restricting member 40 (first path restricting cover) that is attached to the outer circumference of the exterior member 30, a second path restricting member 50 (second path restricting cover) that is attached to the outer circumference of the first path restricting member 40, and a third path restricting member 60 (third path restricting cover) that is attached to the outer circumference of the exterior member 30. The first path restricting member 40, the second path restricting member 50, and the third path restricting member 60 restrict the path along which the wire harness main body 11 is routed. Note that the first path restricting member 40, the second path restricting member 50, and the third path restricting member 60 are omitted from FIG. 1.

Configuration of Electric Wire Member 20

Figure 3:
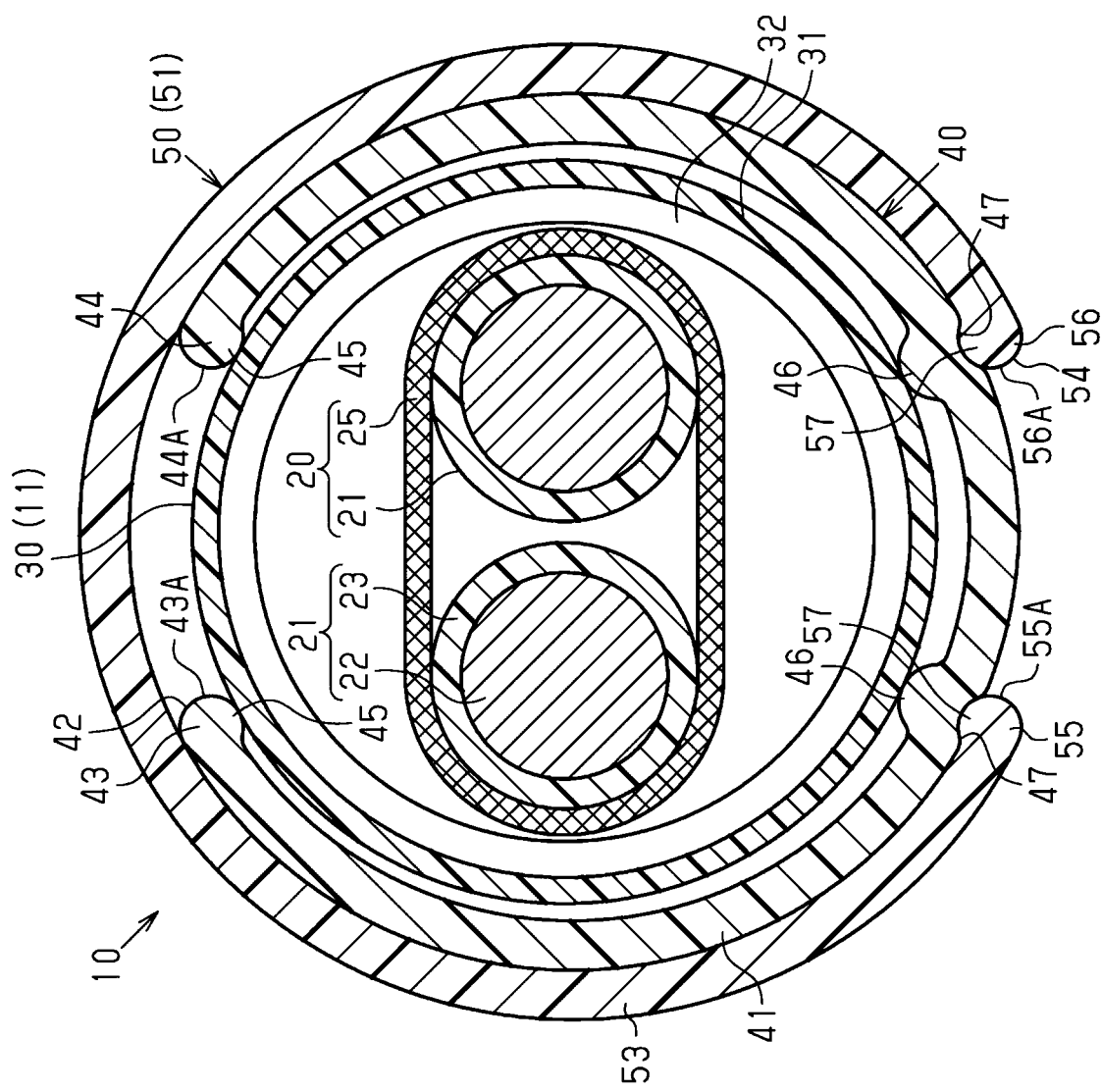
FIG. 3 is a schematic cross-sectional view (taken on line 3-3 of FIG. 2) showing a wire harness according to an embodiment.
Figure 4:
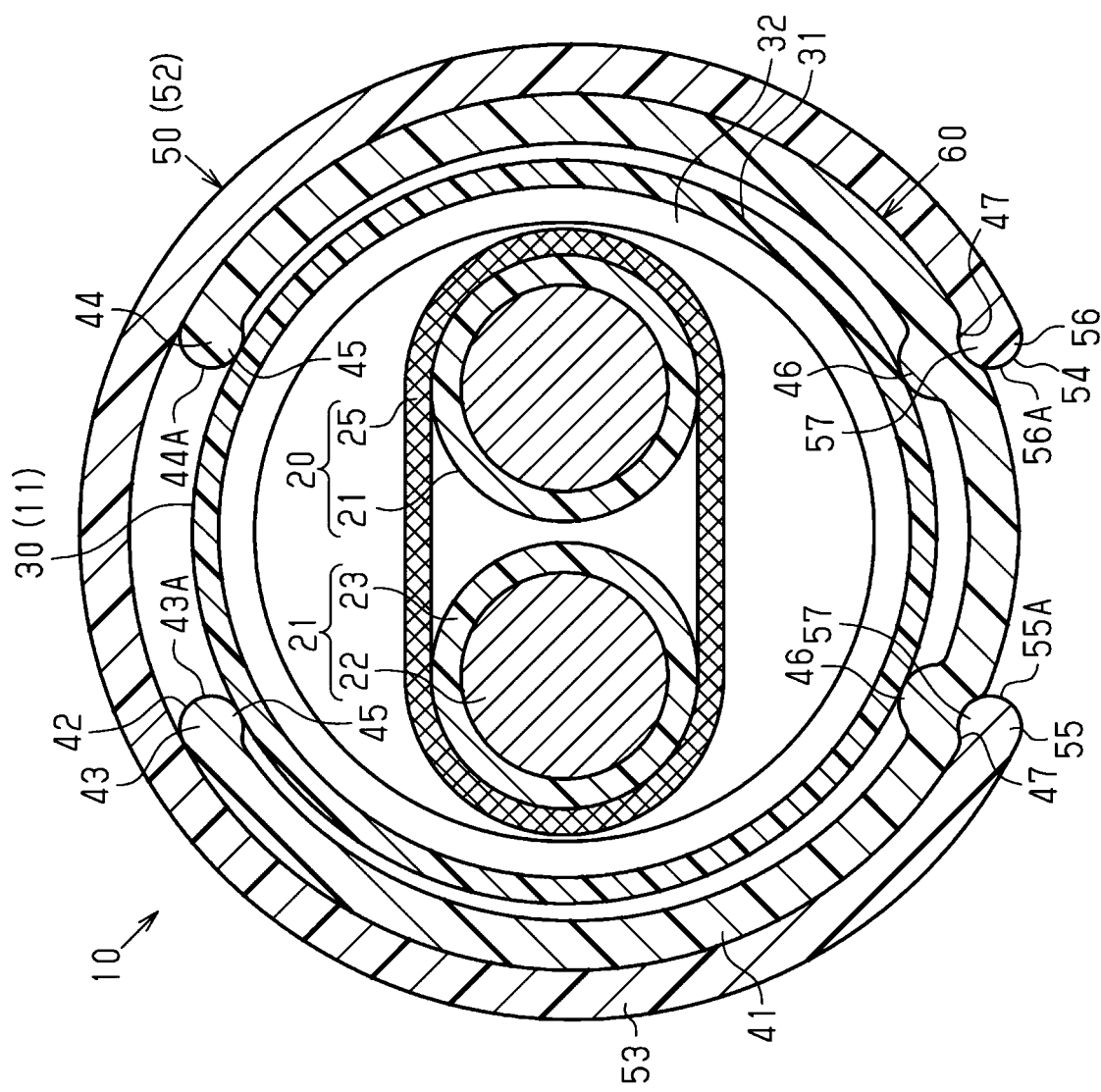
FIG. 4 is a schematic cross-sectional view (taken on line 4-4 of FIG. 2) showing a wire harness according to an embodiment.
Figure 5:
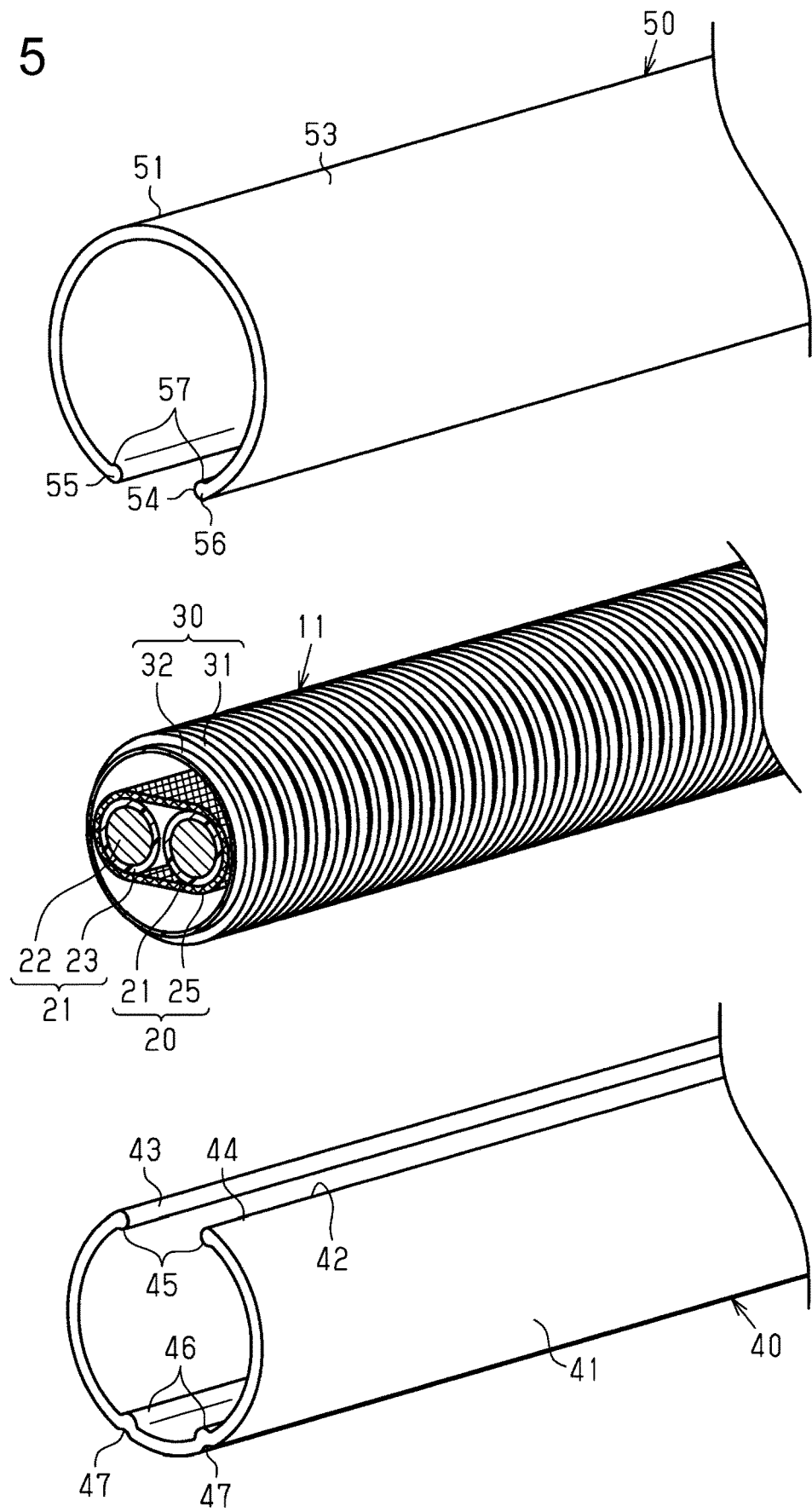
FIG. 5 is a schematic exploded perspective view showing a wire harness according to an embodiment.

As shown in FIGS. 3 to 5, for example, the electric wire member 20 includes one or more electric wires 21 (two in the present embodiment) and a braided member 25 that collectively encloses the outer circumferences of the plurality of electric wires 21.

Each electric wire 21 is a coated electric wire that includes a conductive core wire 22 and an insulating coating 23 that encloses the outer circumference of the core wire 22 and has insulating properties. Each electric wire 21 is, for example, a high-voltage electric wire that supports a high voltage and a large current. Each electric wire 21 may be, for example, a non-shielded electric wire that does not have an electromagnetic shield structure, or a shielded electric wire that has an electromagnetic shield structure. Each electric wire 21 of the present embodiment is a non-shielded electric wire.

As the core wire 22, a stranded wire that is constituted by a plurality of metal strands twisted together, a single core wire that is constituted by a single conductor, or the like may be used, for example. As the single core wire, a columnar conductor that is constituted by one columnar metal rod with a solid internal structure, a tubular conductor with a hollow internal structure, or the like may be used, for example. As the core wire 22, a combination of a stranded wire, a columnar conductor, or a tubular conductor may be used. As the material of the core wire 22, a metal material such as a copper-based material or an aluminum-based material may be used, for example.

The insulating coating 23 covers, for example, all the way around the outer circumferential surface of the core wire 22. The insulating coating 23 is constituted by, for example, a resin material that has insulating properties.

The cross-sectional shape of each wire 21 cut along a plane that is orthogonal to the lengthwise direction of each wire 21, that is, the transverse cross-sectional shape of each wire 21, may be any shape. The transverse cross-sectional shape of each electric wire 21 may be, for example, a circular shape, a semicircular shape, a polygonal shape, a square shape, a flat shape, or the like. The transverse cross-sectional shape of each electric wire 21 of the present embodiment is a circular shape.

The braided member 25 has, for example, a tubular shape that collectively encloses the outer circumferences of the plurality of electric wires 21. As the braided member 25, a braided wire in which a plurality of metal strands are braided or a braided wire in which metal strands and resin strands are braided in combination with each other may be used, for example. As the material of the metal strands, a metal material such as a copper-based material or an aluminum-based material may be used, for example. Although not shown in the drawings, the two end portions of the braided member 25 in the lengthwise direction are grounded at, for example, the connectors C1 and C2 (see FIG. 1).

Configuration of Exterior Member 30

As shown in FIG. 5, the exterior member 30 has a tubular shape that encloses all the way around the outer circumference of the electric wire member 20. The exterior member 30 of the present embodiment is formed in a cylindrical shape. The exterior member 30 is, for example, sealed all the way around the circumferential surface of the exterior member 30. The exterior member 30 has, for example, a function of protecting the electric wire member 20 from flying objects and water droplets.

The exterior member 30 has, for example, flexibility and is easily bendable. Examples of the flexible exterior member 30 include a resin corrugated tube and a rubber waterproof cover. The exterior member 30 of the present embodiment is a resin corrugated tube having an accordion structure in which ring-shaped protrusions 31 and ring-shaped recesses 32 are provided alternatingly and continuously along the lengthwise direction of the exterior member 30. Each of the ring-shaped protrusions 31 and the ring-shaped recesses 32 has, for example, a ring shape that encircles the exterior member 30 once in the circumferential direction. As the material of the exterior member 30, for example, a synthetic resin such as polyolefin, polyamide, polyester, or ABS resin can be used.

Configurations of First Path Restricting Member 40, Second Path Restricting Member 50, and Third Path Restricting Member 60

As shown in FIG. 2, each of the first path restricting member 40, the second path restricting member 50, and the third path restricting member 60 are provided along a portion in the lengthwise direction of the wire harness main body 11. The first path restricting member 40, the second path restricting member 50, and the third path restricting member 60 restrict, for example, a path of the wire harness main body 11 in a straight section 11A, which is a section having a linear shape in the path of the wire harness main body 11. Here, the straight section 11A is a section in which the path of the wire harness main body 11 extends straight in one direction. The first path restricting member 40, the second path restricting member 50, and the third path restricting member 60 hold the exterior member 30 in the straight section 11A. Each of the first path restricting member 40, the second path restricting member 50, and the third path restricting member 60 is harder than, for example, the exterior member 30. Each of the first path restricting member 40, the second path restricting member 50, and the third path restricting member 60 has a hardness that makes it more difficult to bend in a direction orthogonal to the lengthwise direction of the wire harness main body 11 compared to the exterior member 30. For example, the first path restricting member 40, the second path restricting member 50, and the third path restricting member 60 support the exterior member 30 so that the wire harness main body 11 does not deviate from the desired path by bending due to its own weight or the like. The exterior member 30 is more difficult to bend than, for example, if the first path restricting member 40, the second path restricting member 50, and the third path restricting member 60 are not attached.

The first path restricting member 40 and the third path restricting member 60 are provided spaced apart from each other in the lengthwise direction of the wire harness main body 11. In other words, the outer surface of the exterior member 30 is exposed from the first path restricting member 40 and the third path restricting member 60 in the lengthwise direction of the wire harness main body 11 between the first path restricting member 40 and the third path restricting member 60. The second path restricting member 50 covers the outer circumference of a portion in the lengthwise direction of the first path restricting member 40, and covers the outer circumference of the exterior member 30 that is displaced from the first path restricting member 40 in the lengthwise direction of the wire harness main body 11 and is exposed from the first path restricting member 40. The second path restricting member 50 is capable of sliding along the outer circumference of the first path restricting member 40 in the lengthwise direction of the wire harness main body 11. In other words, the second path restricting member 50 is capable of sliding with respect to the first path restricting member 40 in the lengthwise direction of the wire harness main body 11.

The second path restricting member 50 of the present embodiment is provided in the lengthwise direction of the wire harness main body 11 to extend from one end portion in the lengthwise direction of the first path restricting member 40 to the third path restricting member 60. The second path restricting member 50 has a first covering portion 51 (first cover) that covers the outer circumference of the first path restricting member 40 and a second covering portion 52 (second cover) that covers the outer circumference of the third path restricting member 60. The first covering portion 51 is provided, for example, at one end portion in the lengthwise direction of the second path restricting member 50. The first path restricting member 51 is provided in the lengthwise direction of the wire harness main body 11 to overlap with one end portion in the lengthwise direction of the first path restricting member 40. The second covering portion 52 is provided, for example, at the end portion opposite to the first path restricting member 51 in the lengthwise direction of the second path restricting member 50. The second path restricting member 52 is provided in the lengthwise direction of the wire harness main body 11 to overlap with an end portion in the lengthwise direction of the third path restricting member 60. The second path restricting member 50 of the present embodiment covers the outer circumference of the exterior member 30 provided between the first path restricting member 40 and the third path restricting member 60 in the lengthwise direction of the wire harness main body 11. That is, the lengthwise portion of the second path restricting member 50 between the first covering portion 51 and the second covering portion 52 covers the outer circumference of the exterior member 30 provided between the first path restricting member 40 and the third path restricting member 60 in the lengthwise direction of the wire harness main body 11. Note that the first path restricting member 40 is exposed from the second path restricting portion 50 except for a lengthwise end portion of the first path restricting member 40. The third path restricting member 60 is exposed, for example, from the second path restricting portion 50 except for a lengthwise end portion of the third path restricting member 60.

Configuration of First Path Restricting Member 40

As shown in FIG. 3, the first path restricting member 40 covers part of the outer circumference of the exterior member 30 in the circumferential direction of the exterior member 30. The first path restricting member 40 has a tubular shape that covers the outer circumference of the exterior member 30 in a portion in the circumferential direction of the exterior member 30. The first path restricting member 40 covers, for example, a range larger than half of the outer circumference of the exterior member 30. The transverse cross-sectional shape of the first path restricting member 40 is generally C-shaped. The transverse cross-sectional shape of the first path restricting member 40 is, for example, uniform over the entire length in the lengthwise direction of the first path restricting member 40. As shown in FIG. 2, the first path restricting member 40 extends along the path of the straight section 11A, and is formed in a shape extending linearly in one direction, for example.

The first path restricting member 40 is made of metal or resin, for example. The first path restricting member 40 of the present embodiment is made of resin. As the material of the first path restricting member 40, a synthetic resin such as polypropylene, polyamide, or polyacetal may be used, for example. The first path restricting member 40 may be manufactured by extrusion molding or injection molding, for example.

As shown in FIG. 3, the first path restricting member 40 has a first main body portion 41 (first main body) that covers part of the outer circumference of the exterior member 30, and a first insertion port 42 that is open in a direction orthogonal to the lengthwise direction of the first main body portion 41. The first path restricting member 40 has a first end portion 43 and a second end portion 44 which are the two end portions in the circumferential direction of the first main body portion 41 and form the first insertion port 42.

The first main body portion 41 forms the main part of the first path restricting member 40. The thickness in the radial direction of the first main body portion 41 is, for example, uniform in the circumferential direction of the first path restricting member 40. The transverse cross-sectional shape of the first main body portion 41 is formed, for example, in a shape that extends along the outer surface of the exterior member 30. The transverse cross-sectional shape of the first main body portion 41 is formed, for example, in an arc shape.

The first end portion 43 and the second end portion 44 are provided on opposite sides from each other in the circumferential direction of the first main body portion 41. The first end portion 43 and the second end portion 44 are provided spaced apart from each other across the first insertion port 42 in the circumferential direction of the first main body portion 41. In other words, the gap between the first end portion 43 and the second end portion 44 in the circumferential direction of the first path restricting member 40 is formed as the first insertion port 42. As described above, the first path restricting member 40 is formed in a C shape having the first insertion port 42 in a portion in the circumferential direction of the first main body portion 41.

The opening width of the first insertion port 42, that is, the shortest distance between the first end portion 43 and the second end portion 44 is smaller than, for example, the outer diameter of the exterior member 30. As shown in FIG. 5, the first insertion port 42 extends along the lengthwise direction of the first main body portion 41 over the entire length in the lengthwise direction of the first main body portion 41. That is, the first insertion port 42 is formed so as to be open in a direction orthogonal to the lengthwise direction of the first main body portion 41 and to be open at both ends in the lengthwise direction of the first main body portion 41.

By inserting the exterior member 30 into the first insertion port 42 from a direction orthogonal to the lengthwise direction of the first path restricting member 40, the first path restricting member 40 is elastically deformed and the opening width of the first insertion port 42 is increased. When the exterior member 30 is inserted into the first path restricting member 40, the first path restricting member 40 elastically returns to restore its original shape. As a result, the opening width of the first insertion port 42 is smaller than the outer diameter of the exterior member 30 so as to attach the first path restricting member 40 to the outer circumference of the exterior member 30.

As shown in FIG. 3, the first end portion 43 has a leading end 43A. The second end portion 44 has a leading end 44A. The leading ends 43A and 44A form the first insertion port 42. The leading ends 43A and 44A are formed in a curved shape when viewed from the lengthwise direction of the first path restricting member 40. That is, the transverse cross-sectional shapes of the leading ends 43A and 44A are formed in curved shapes. The transverse cross-sectional shapes of the leading ends 43A and 44A of the present embodiment are formed in semicircular shapes.

The first path restricting member 40 has, for example, first protruding portions 45 (first protrusion) protruding from the inner surfaces of the first end portion 43 and the second end portion 44. Each of the first protruding portions 45 protrudes toward the exterior member 30 inserted into the first path restricting member 40 and can come into contact with the outer surface of the exterior member 30. Each of the first protruding portions 45 is in contact with, for example, the outer surfaces of the ring-shaped protrusions 31 of the exterior member 30. The two first protruding portions 45 protrude from the inner surfaces of the leading ends 43A and 44A, for example. The transverse cross-sectional shape of each of the first protruding portions 45 is formed, for example, into a curved shape. The transverse cross-sectional shape of each of the first protruding portions 45 of the present embodiment is formed in a semicircular shape. Each of the first protruding portions 45 extends along the lengthwise direction of the first path restricting member 40 over the entire length in the lengthwise direction of the first path restricting member 40.

The first path restricting member 40 has, for example, one or more (two in this embodiment) support protruding portions 46 that protrude from the inner surface of the first main body portion 41. Each support protruding portion 46 protrudes toward the exterior member 30 from the inner surface of the first main body portion 41 and can come into contact with the outer surface of the exterior member 30. Each of the support protruding portions 46 is in contact with, for example, the outer surfaces of the ring-shaped protrusions 31 of the exterior member 30. The two support protruding portions 46 are provided spaced apart from each other in the circumferential direction of the first path restricting member 40. The transverse cross-sectional shape of each support protruding portion 46 is formed in a curved shape. The transverse cross-sectional shape of each support protruding portion 46 of the present embodiment is formed, for example, in a semicircular shape. Each support protruding portion 46 extends, for example, along the lengthwise direction of the first path restricting member 40 over the entire length in the lengthwise direction of the first path restricting member 40.

Each of the first protruding portions 45 and the support protruding portions 46 presses the exterior member 30 from the outside of the exterior member 30, for example. The exterior member 30 is elastically interposed between the first protruding portions 45 and the support protruding portions 46, for example. As a result, the connection of the first path restricting member 40 to the exterior member 30 is strengthened. Accordingly, the first path restricting member 40 attached to the outer circumference of the exterior member 30 is suppressed from moving in the lengthwise direction of the exterior member 30.

Since each of the first protruding portions 45 and the support protruding portions 46 comes into contact with the outer surface of the exterior member 30, a gap is formed between the inner surface of the first main body portion 41 and the outer surface of the exterior member 30. This gap extends over the entire length in the lengthwise direction of the first path restricting member 40.

The first path restricting member 40 has one or more (two in this embodiment) recesses 47 that are recessed from the outer surface of the first main body portion 41. Each recess 47 is provided, for example, in the part of the outer surface of the first main body portion 41 where a support protruding portion 46 is provided. Each recess 47 is provided, for example, at a position overlapping with a support protruding portion 46 in the radial direction of the first path restricting member 40. Each recess 47 is recessed from the outer surface of the first main body portion 41 radially inward of the first path restricting member 40. Each recess 47 does not radially penetrate the first main body portion 41. The transverse cross-sectional shape of each recess 47 is formed in a curved shape. The transverse cross-sectional shape of each recess 47 of the present embodiment is formed in a semicircular shape. As shown in FIG. 5, each recess 47 extends, for example, along the lengthwise direction of the wire harness main body 11. Each recess 47 extends, for example, along the lengthwise direction of the first main body portion 41 over the entire length in the lengthwise direction of the first main body portion 41.

Configuration of Third Path Restricting Member 60

As shown in FIG. 4, the third path restricting member 60 covers part of the outer circumference of the exterior member 30 in the circumferential direction of the exterior member 30. The third path restricting member 60 has a tubular shape that covers the outer circumference of the exterior member 30 in a portion in the circumferential direction of the exterior member 30. The third path restricting member 60 covers, for example, a range larger than half of the outer circumference of the exterior member 30. The transverse cross-sectional shape of the third path restricting member 60 is generally C-shaped. The transverse cross-sectional shape of the third path restricting member 60 is, for example, uniform over the entire length in the lengthwise direction of the third path restricting member 60. The third path restricting member 60 of the present embodiment has the same transverse cross-sectional shape as the first path restricting member 40. Accordingly, components of the third path restricting member 60 identical to those of the first path restricting member 40 are assigned identical reference signs and description thereof is omitted herein. As shown in FIG. 2, the third path restricting member 60 extends along the path of the straight section 11A, and is formed in a shape extending linearly in one direction, for example. The third path restricting member 60 is shorter than the first path restricting member 40 in the lengthwise direction of the wire harness main body 11.

The third path restricting member 60 is made of, for example, metal or resin. The third path restricting member 60 of the present embodiment is made of resin. As the material of the third path restricting member 60, for example, a synthetic resin such as polypropylene, polyamide, or polyacetal can be used. The third path restricting member 60 may be manufactured by extrusion molding or injection molding, for example.

Configuration of Second Path Restricting Member 50

As shown in FIGS. 3 and 4, the second path restricting member 50 covers part of the outer circumference of the exterior member 30 in the circumferential direction of the exterior member 30. The second path restricting member 50 has a tubular shape that covers the outer circumference of the exterior member 30 in a portion in the circumferential direction of the exterior member 30. The second path restricting member 50 covers, for example, a range larger than half of the outer circumference of the exterior member 30.

As shown in FIG. 3, the first covering portion 51 of the second path restricting member 50 covers part of the outer circumference of the first path restricting member 40 in the circumferential direction of the first path restricting member 40. The first covering portion 51 covers, for example, a range larger than half of the outer circumference of the first path restricting member 40. As shown in FIG. 4, the second covering portion 52 of the second path restricting member 50 covers part of the outer circumference of the third path restricting member 60 in the circumferential direction of the third path restricting member 60. The second covering portion 52 covers, for example, a range larger than half of the outer circumference of the third path restricting member 60.

The transverse cross-sectional shape of the second path restricting member 50 is generally C-shaped. The transverse cross-sectional shape of the second path restricting member 50 is, for example, uniform over the entire length in the lengthwise direction of the second path restricting member 50. As shown in FIG. 2, the second path restricting member 50 extends along the path of the straight section 11A, and is formed in a shape extending linearly in one direction, for example.

The second path restricting member 50 is made of, for example, metal or resin. The second path restricting member 50 of the present embodiment is made of resin. As the material of the second path restricting member 50, for example, a synthetic resin such as polypropylene, polyamide, or polyacetal can be used. The second path restricting member 50 may be manufactured by extrusion molding or injection molding, for example.

As shown in FIG. 3, the second path restricting member 50 has a second main body portion 53 (second main body) that covers part of the outer circumference of the exterior member 30, and a second insertion port 54 that opens in a direction orthogonal to the lengthwise direction of the second main body portion 53. The second path restricting member 50 has a third end portion 55 and a fourth end portion 56 which are the two ends in the circumferential direction of the second main body portion 53 and form the second insertion port 54.

The second main body portion 53 forms the main part of the second path restricting member 50. The thickness in the radial direction of the second main body portion 53 is, for example, uniform in the circumferential direction of the second path restricting member 50. The transverse cross-sectional shape of the second main body portion 53 is formed, for example, in a shape that extends along the outer surface of the exterior member 30. The transverse cross-sectional shape of the second main body portion 53 is formed, for example, in a shape that extends along the outer surface of the first path restricting member 40. The transverse cross-sectional shape of the second main body portion 53 is formed, for example, in an arc shape.

The third end portion 55 and the fourth end portion 56 are provided on mutually opposite sides in the circumferential direction of the second main body portion 53. The third end portion 55 and the fourth end portion 56 are provided spaced apart from each other across the second insertion port 54 in the circumferential direction of the second main body portion 53. In other words, the gap between the third end portion 55 and the fourth end portion 56 in the circumferential direction of the second path restricting member 50 is formed as the second insertion port 54. As described above, the second path restricting member 50 is formed in a C shape having the second insertion port 54 in a portion in the circumferential direction of the second main body portion 53.

The opening width of the second insertion port 54, that is, the shortest distance between the third end portion 55 and the fourth end portion 56 is smaller than, for example, the maximum outer diameter of the first path restricting member 40. The opening width of the second insertion port 54 is smaller than, for example, the outer diameter of the exterior member 30. As shown in FIG. 5, the second insertion port 54 extends along the lengthwise direction of the second main body portion 53. The second insertion port 54 extends over the entire length in the lengthwise direction of the second main body portion 53. That is, the second insertion port 54 is formed so as to be open in a direction orthogonal to the lengthwise direction of the second main body portion 53 and to be open at both lengthwise ends of the second main body portion 53.

The second path restricting member 50 is attached to the outer circumferences of the first path restricting member 40 and the third path restricting member 60 (see FIG. 4) such that the orientation of the second insertion port 54 is different from that of the first insertion port 42. In the present embodiment, the orientation of the second insertion port 54 is designed diametrically opposite to that of the first insertion port 42. That is, as shown in FIG. 3, the orientation of the first insertion port 42 and that of the second insertion port 54 are set so as to be opposite to each other in a radial direction of the exterior member 30. In other words, the first insertion port 42 and the second insertion port 54 are open in opposite directions to each other in the radial direction of the exterior member 30. Moreover, the second main body portion 53 covers the first insertion port 42. The second main body 53 covers, for example, the outer circumference of the exterior member 30 exposed from the first insertion port 42.

By inserting the exterior member 30 and the first path restricting member 40 into the second insertion port 54 from a direction orthogonal to the lengthwise direction of the second path restricting member 50, the second path restricting member 50 is elastically deformed and the opening width of the second insertion port 54 is increased. When the exterior member 30 and the first path restricting member 40 are inserted into the second path restricting member 50, the second path restricting member 50 elastically returns to restore its original shape. As a result, as the opening width of the second insertion port 54 is smaller than the outer diameter of the first path restricting member 40, it is possible to attach the second path restricting member 50 to the outer circumference of the first path restricting member 40. Note that the second path restricting member 50 is similarly attached to the outer circumference of the third path restricting member 60 (see FIG. 4).

As shown in FIGS. 3 and 4, the third end portion 55 has a leading end 55A. The fourth end portion 56 has a leading end 56A. The leading ends 55A and 56A form the second insertion port 54. The transverse cross-sectional shapes of the leading ends 55A and 56A are formed in curved shapes. The transverse cross-sectional shapes of the leading ends 55A and 56A of the present embodiment are formed in semicircular shapes.

The second path restricting member 50 has, for example, second protruding portions 57 (second protrusions) protruding from the inner surfaces of the third end portion 55 and the fourth end portion 56. Each of the second protruding portions 57 protrudes toward the first main body portion 41 inserted into the second path restricting member 50. Each of the second protruding portions 57 can be in contact with the outer surfaces of the first main body portion 41. The second protruding portions 57 can be in contact with the respective recesses 47 provided in the first main body portion 41. In other words, the recesses 47 are provided where the recesses 47 can engage with the respective second protruding portions 57, for example, when the second path restricting member 50 is attached in such a way that the second insertion port 54 and the first insertion port 42 are oriented diametrically opposite to each other. At this moment, when the second protruding portions 57 are fitted into the interiors of the respective recesses 47, the side surfaces of the second protruding portions 57 engage with the inner surfaces of the respective recesses 47 in the circumferential direction of the wire harness main body 11. As a result, the movement of the second path restricting member 50 is suppressed with respect to the first path restricting member 40 in the circumferential direction of the wire harness main body 11. Likewise, the movement of the second path restricting member 50 is suppressed with respect to the third path restricting member 60 in the circumferential direction of the wire harness main body 11. The transverse cross-sectional shape of each second protruding portion 57 is formed, for example, in a shape that conforms to the inner surface of the recess 47. The transverse cross-sectional shape of each of the second protruding portions 57 is formed, for example, into a curved shape. The transverse cross-sectional shape of each of the second protruding portions 57 of the present embodiment is formed in a semicircular shape. Each of the second protruding portions 57 extends, for example, along the lengthwise direction of the second path restricting member 50 over the entire length in the lengthwise direction of the second path restricting member 50.

The inner diameter of the second body portion 53 is formed larger than the outer diameter of the exterior member 30. For example, the inner diameter of the second body portion 53 is formed larger than the outer diameter of the exterior member 30 to the extent that, when the exterior member 30 is inserted into the inside of the second body portion 53, only either the inner surface of the second body portion 53 or the second protruding portions 57 can come into contact with the outer surface of the exterior member 30 while the other cannot come into contact with the outer surface of the exterior member 30. As a result, for example, if the second covering portion 52 was directly attached to the outer surface of the exterior member 30, the second path restricting member 50 would be tilted in a direction in which the lengthwise direction of the second path restricting member 50 intersects the lengthwise direction of the exterior member 30. In the present embodiment, however, the third path restricting member 60 is interposed between the inner surface of the second covering portion 52 and the outer surface of the exterior member 30. The third path restricting member 60 can fill the gap between the inner surface of the second covering portion 52 and the outer surface of the exterior member 30. Therefore, the lengthwise direction of the second path restricting member 50 can be advantageously prevented from being tilted with respect to the lengthwise direction of the exterior member 30. As a result, the second route restricting member 50 can be stably attached to the outer circumference of the exterior member 30 via the first path restricting member 40 and the third path restricting member 60.

Configurations of First Fixing Member 71, Second Fixing Member 72, and Third Fixing Member 73

As shown in FIG. 2, the wire harness 10 includes, for example, a first fixing member 71 that fixes the first covering portion 51 of the second path restricting member 50 to the outer circumference of the first path restricting member 40. The wire harness 10 includes, for example, a second fixing member 72 that fixes, to the outer circumference of the exterior member 30, the end portion in the lengthwise direction of the first path restricting member 40 that is exposed from the second path restricting member 50. The wire harness 10 includes, for example, a third fixing member 73 that fixes the second covering portion 52 of the second path restricting member 50 to the outer circumference of the exterior member 30. For example, resin or metal cable ties, caulking rings or adhesive tape among other materials can be used as the first fixing member 71, the second fixing member 72, and the third fixing member 73. The first fixing member 71, the second fixing member 72, and the third fixing member 73 of the present embodiment are adhesive tape.

The first fixing member 71 is wrapped from the first covering portion 51 to the first path restricting member 40. The first fixing member 71 is wrapped from the outer surface of the first covering portion 51 to where the outer surface of the first path restricting member 40 is exposed from the second path restricting member 50. The first fixing member 71 covers the first covering portion 51 and the first path restricting member 40 around their entire circumferences. The first fixing member 71 can restrict the movement of the second path restricting member 50 with respect to the first path restricting member 40 in the lengthwise and circumferential directions of the wire harness main body 11. The second fixing member 72 is wrapped from the outer surface of the one of the two lengthwise end portions of the first path restricting member 40 that is exposed from the second path restricting member 50 to the outer surface of the exterior member 30. The second fixing member 72 covers the first path restricting member 40 and the exterior member 30 around their entire circumferences. The second fixing member 72 can restrict the movement of the first path restricting member 40 with respect to the exterior member 30 in the lengthwise and circumferential directions of the wire harness main body 11. The third fixing member 73 is wrapped from the second covering portion 52 to the exterior member 30. The third fixing member 73 is wrapped, for example, from the outer surface of the second covering portion 52 to the outer surface of the exterior member 30 via the outer surface of the third path restricting member 60. The third fixing member 73 covers the outer surface of the second path restricting member 50, the outer surface of the third path restricting member 60, and the outer surface of the exterior member 30 around their entire circumferences. The third fixing member 73 can restrict the movement of the second path restricting member 50 and the third path restricting member 60 with respect to the exterior member 30 in the lengthwise and circumferential directions of the wire harness main body 11.

Note that the first fixing member 71, the second fixing member 72, and the third fixing member 73 are omitted from the view in FIGS. 1 and 3 to 5.

The operation of the present embodiment will be described hereinafter.

A portion in the lengthwise direction of the first path restricting member 40 and a portion in the lengthwise direction of the second path restricting member 50 are provided overlapping with each other in the lengthwise direction of the wire harness main body 11. Moreover, the second path restricting member 50 covers the outer circumference of a portion in the lengthwise direction of the first path restricting member 40, and covers the outer circumference of the exterior member 30 that is displaced from the first path restricting member 40 in the lengthwise direction of the wire harness main body 11. Furthermore, the second path restricting member 50 is capable of sliding along the outer circumference of the first path restricting member 40 in the lengthwise direction of the wire harness main body 11. Due to the above features, the width of overlapping between the first path restricting member 40 and the second path restricting member 50 can be easily adjusted by sliding the second path restricting member 50 with respect to the first path restricting member 40 in the lengthwise direction of the wire harness main body 11. By adjusting the width of overlapping, the overall length of the first path restricting member 40 and the second path restricting member 50 in the lengthwise direction of the wire harness main body 11 can be easily adjusted. That is, the length of the section in which path restriction is implemented by the first path restricting member 40 and the second path restricting member 50 can be easily adjusted by the adjustment of the width of overlapping between the first path restricting member 40 and the second path restricting member 50.

Figure 6:
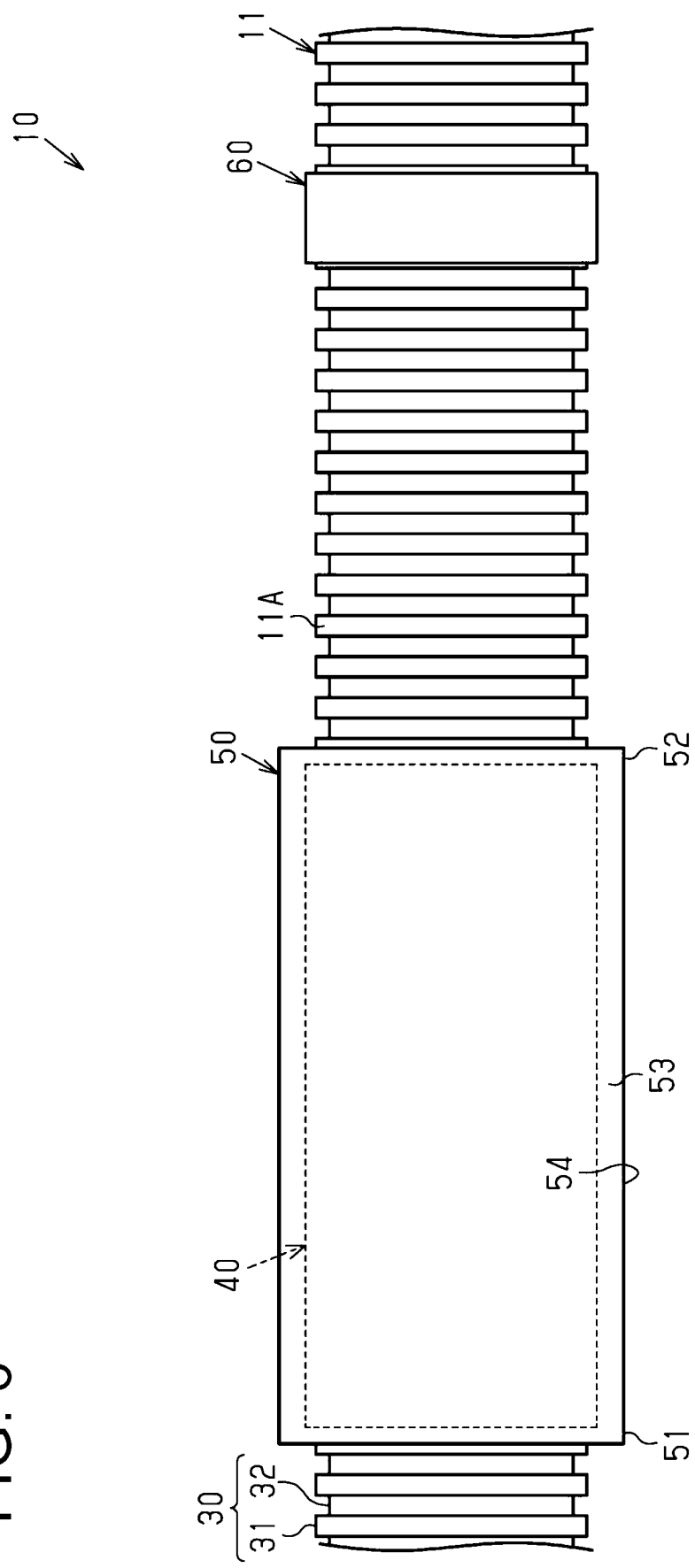
FIG. 6 is a schematic side view showing an effect of a wire harness according to an embodiment.

As shown in FIG. 6, by sliding the second path restricting member 50 with respect to the first path restricting member 40, for example, the second path restricting member 50 can be arranged so as to cover the outer circumference of the first path restricting member 40 over the entire length in the lengthwise direction of the first path restricting member 40. In other words, the first path restricting member 40 and the second path restricting member 50 can be arranged together in one location in the lengthwise direction of the wire harness main body 11. By adopting this configuration, the overall length of the first path restricting member 40 and the second path restricting member 50 can be shortened during the transportation of the wire harness 10, for example. As such, since the exterior member 30 can be bent at a position between the second path restricting member 50 and the third path restricting member 60, the packaging size of the wire harness 10 during transportation can be reduced. As a result, an increase in the cost of transportation of the wire harness 10 can be advantageously suppressed. Note that, in the state shown in FIG. 6, the first fixing member 71 is not disposed as shown in FIG. 2. Therefore, once the transportation of the wire harness 10 is completed, the first path restricting member 40 can be slid relative to the second path restricting member 50.

Figure 7:
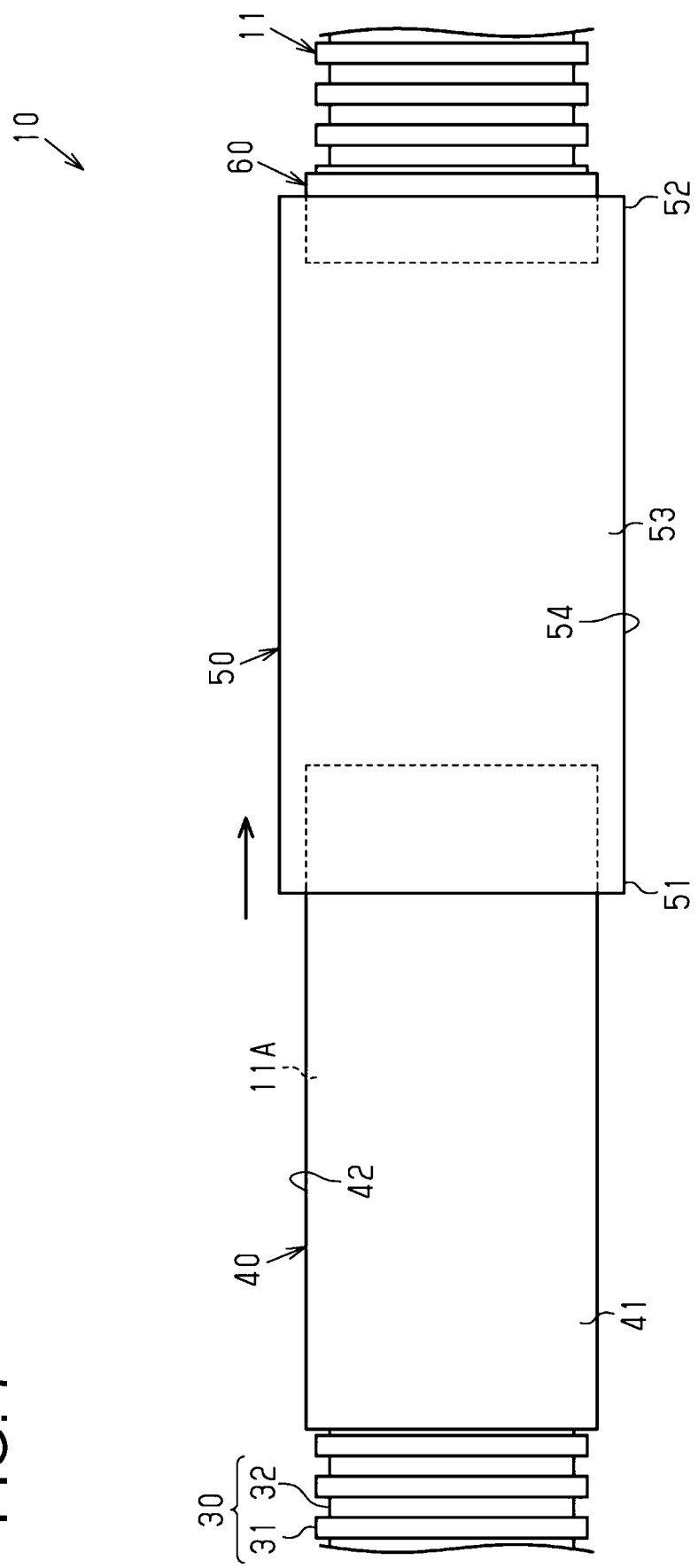
FIG. 7 is a schematic side view showing an effect of a wire harness according to an embodiment.

As shown in FIG. 7, the overall length of the first path restricting member 40 and the second path restricting member 50 can be changed by sliding the second path restricting member 50 from the position shown in FIG. 6 (as indicated by the arrow in the drawing) toward the third path restricting member 60. In this regard, by providing the third path restricting member 60 in a location corresponding to one end of the path restriction section, the second path restricting member 50 can be easily positioned in the lengthwise direction of the wire harness main body 11 when sliding the second path restricting member 50. Note that, for example, the first fixing member 71, the second fixing member 72, and the third fixing member 73 are installed as shown in FIG. 2 after the second path restricting member 50 is slid to the third path restricting member 60.

The effects of the present embodiment will be described hereinafter.

(1) The second path restricting member 50 is configured to be capable of sliding along the outer circumference of the first path restricting member 40 in the lengthwise direction of the wire harness main body 11. According to this configuration, the overall length of the first path restricting member 40 and the second path restricting member 50 can be easily adjusted by the adjustment of the width of overlapping between the first path restricting member 40 and the second path restricting member 50. Therefore, even if the length of the path restriction section is changed due to changes in the specifications, for example, of the routing path of the wire harness main body 11, the change in the specifications can be easily accommodated by adjusting the width of overlapping between the first path restricting member 40 and the second path restricting member 50.

(2) The first insertion port 42 of the first path restricting member 40 is formed so as to be open in a direction orthogonal to the lengthwise direction of the first main body portion 41 and to extend over the entire length in the lengthwise direction of the first main body portion 41. This makes it possible to attach the first path restricting member 40 from the first insertion port 42 to the exterior member 30 after performing terminal processing such as attaching connectors C1 and C2 to the end portions in the lengthwise direction of the electric wire members 20. In this manner, since the first path restricting member 40 can be retrofitted, it is possible to improve the assembly workability of the wire harness 10.

(3) The second insertion port 54 of the second path restricting member 50 is formed so as to be open in a direction orthogonal to the lengthwise direction of the second main body portion 53 and to extend over the entire length in the lengthwise direction of the second main body portion 53. As a result, it is possible to retrofit the second path restricting member 50 to the outer circumference of the exterior member 30 and the outer circumference of the first path restricting member 40 via the second insertion port 54. This makes it possible to improve the assembly workability of assembling the wire harness 10.

(4) Both of the first path restricting member 40 and the second path restricting member 50 are provided around the outer circumference of the exterior member 30 where the first path restricting member 40 and the second path restricting member 50 overlap with each other. As a result, the flexural rigidity of the wire harness 10 can be improved where the first path restricting member 40 and the second path restricting member 50 overlap with each other.

(5) The first path restricting member 40 is interposed between the first covering portion 51 of the second path restricting member 50 and the outer surface of the exterior member 30, and the third path restricting member 60 is interposed between the second covering portion 52 of the second path restricting member 50 and the outer surface of the exterior member 30. As a result, the gap between the inner surface of the first covering portion 51 and the outer surface of the exterior member 30 can be filled with the first path restricting member 40, and the gap between the inner surface of the second covering portion 52 and the outer surface of the exterior member 30 can be filled with the third path restricting member 60. Therefore, the lengthwise direction of the second path restricting member 50 can be advantageously prevented from being tilted with respect to the lengthwise direction of the exterior member 30. As a result, the second path restricting member 50 can be stably attached to the outer circumference of the exterior member 30 via the first path restricting member 40 and the third path restricting member 60.

(6) The third path restricting member 60 is configured to have the same transverse cross-sectional shape as the first path restricting member 40. According to this configuration, the first path restricting member 40 is interposed between the inner surface of the first covering portion 51 and the outer surface of the exterior member 30, and the third path restricting member 60, which has the same transverse cross-sectional shape as the first path restricting member 40, is interposed between the inner surface of the second covering portion 52 and the outer surface of the exterior member 30. As a result, components having the same structure can be interposed between the first and second covering portions 51 and 52 and the exterior member 30. As a result, the first path restricting member 40 and the third path restricting member 60, which have the same transverse cross-sectional shape, can fill the gap between the inner surface of the first covering portion 51 and the outer surface of the exterior member 30 and the gap between the inner surface of the second covering portion 52 and the outer surface of the exterior member 30, respectively, in the same manner. Therefore, the lengthwise direction of the second path restricting member 50 can be advantageously prevented from being tilted with respect to the lengthwise direction of the exterior member 30. As a result, the second path restricting member 50 can be attached to the outer circumference of the exterior member 30 with the lengthwise direction of the second path restricting member 50 extending in parallel with the lengthwise direction of the exterior member 30. As such, the second path restricting member 50 can be more stably attached to the outer circumference of the exterior member 30 via the first path restricting member 40 and the third path restricting member 60.

(7) Furthermore, the third path restricting member 60 can be attached to the outer circumference of the exterior member 30 in the same manner as the first path restricting member 40 is. This makes it possible to improve the assembly workability of assembling the wire harness 10.

(8) The third path restricting member 60, which fills the gap between the inner surface of the second covering portion 52 and the outer surface of the exterior member 30, is formed shorter than the first path restricting member 40. Therefore, since the third path restricting member 60 is prevented from being formed longer than necessary, it is possible to suppress an increase in the cost of material of the third path restricting member 60. As a result, an increase in the manufacturing cost of the wire harness 10 can be suppressed.

(9) The first covering portion 51 of the second path restricting member 50 is fixed to the outer circumference of the first path restricting member 40 by the first fixing member 71. Therefore, the first fixing member 71 can be used to fix the first covering portion 51 to the first path restricting member 40, for example, after adjusting the width of overlapping between the first path restricting member 40 and the second path restricting member 50. Accordingly, it is possible to prevent the second path restricting member 50 from moving with respect to the first path restricting member 40 in the lengthwise direction of the wire harness main body 11. As a result, it is possible to advantageously prevent changes in the overall length of the first path restricting member 40 and the second path restricting member 50 once the width of overlapping between the first path restricting member 40 and the second path restricting member 50 is adjusted.

(10) The end portion in the lengthwise direction of the first path restricting member 40 that is exposed from the second path restricting member 50 is fixed to the outer circumference of the exterior member 30 by the second fixing member 72, and the second covering member 52 is fixed to the outer circumference of the exterior member 30 by the third fixing member 73. As a result, the movement of the first path restricting member 40 and the second path restricting member 50 with respect to the exterior member 30 is suppressed in the lengthwise direction of the wire harness main body 11. As such, it is possible to suppress displacement of the first path restricting member 40 and the second path restricting member 50 with respect to the exterior member 30 in the lengthwise direction of the wire harness main body 11, and the positional accuracy of the first path restricting member 40 and the second path restricting member 50 with respect to the covering portion 30 can be improved. As a result, the first path restricting member 40 and the second path restricting member 50 can be advantageously arranged at a desired position of the wire harness main body 11, such as at the straight section 11A in this case, and the path of the straight section 11A can be suitably restricted by the first path restricting member 40 and the second path restricting member 50. In other words, it is possible to advantageously suppress deviation of the installation position of the first path restricting member 40 and the second path restricting member 50 with respect to the wire harness main body 11 from the straight section 11A.

(11) The first path restricting member 40 has a first protruding portion 45 that protrudes from the inner surface of at least one of the first end portion 43 and the second end portion 44 and can come into contact with the outer surface of the exterior member 30. With this first protruding portion 45, for example, the exterior member 30 can be pressed from the outside of the exterior member 30. Therefore, detachment of the first path restricting member 40 from the exterior member 30 through the first insertion port 42 can be advantageously suppressed. Furthermore, the second path restricting member 50 has a second protruding portion 57 that protrudes from the inner surface of at least one of the third end portion 55 and the fourth end portion 56 and can come into contact with the outer surface of the first path restricting member 40. With this second protruding portion 57, for example, the first path restricting member 40 can be pressed from the outside of the first path restricting member 40. Accordingly, detachment of the second path restricting member 50 from the first path restricting member 40 through the second insertion port 54 can be advantageously suppressed.

(12) By recess-protrusion fitting between the recesses 47 formed in the outer surface of the first main body portion 41 and the second protruding portions 57 formed on the inner surface of the second main body portion 53, the recesses 47 are engaged with the second protruding portions 57 in the circumferential direction of the wire harness main body 11. As a result, the relative movement of the second path restricting member 50 is suppressed with respect to the first path restricting member 40 in the circumferential direction of the wire harness main body 11. That is, due to the engagement between the recesses 47 and the second protruding portions 57, it is possible to suppress rotation of the second path restricting member 50 in the circumferential direction with respect to the first path restricting member 40. Therefore, it is possible to suppress displacement of the second path restricting member 50 with respect to the first path restricting member 40 in the circumferential direction of the wire harness main body 11, and the positional accuracy of the second path restricting member 50 with respect to the first path restricting member 40 can be improved.

Other Embodiments

The above embodiment can be modified and implemented as follows. The above-described embodiment and the following modifications can be implemented in combination with each other as long as no contradiction arises.

In the above embodiment, the second path restricting member 50 is attached to the outer circumference of the first path restricting member 40 so that the orientation of the second insertion port 54 is different from that of the first insertion port 42. However, the present disclosure is not limited to this.

Figure 8:
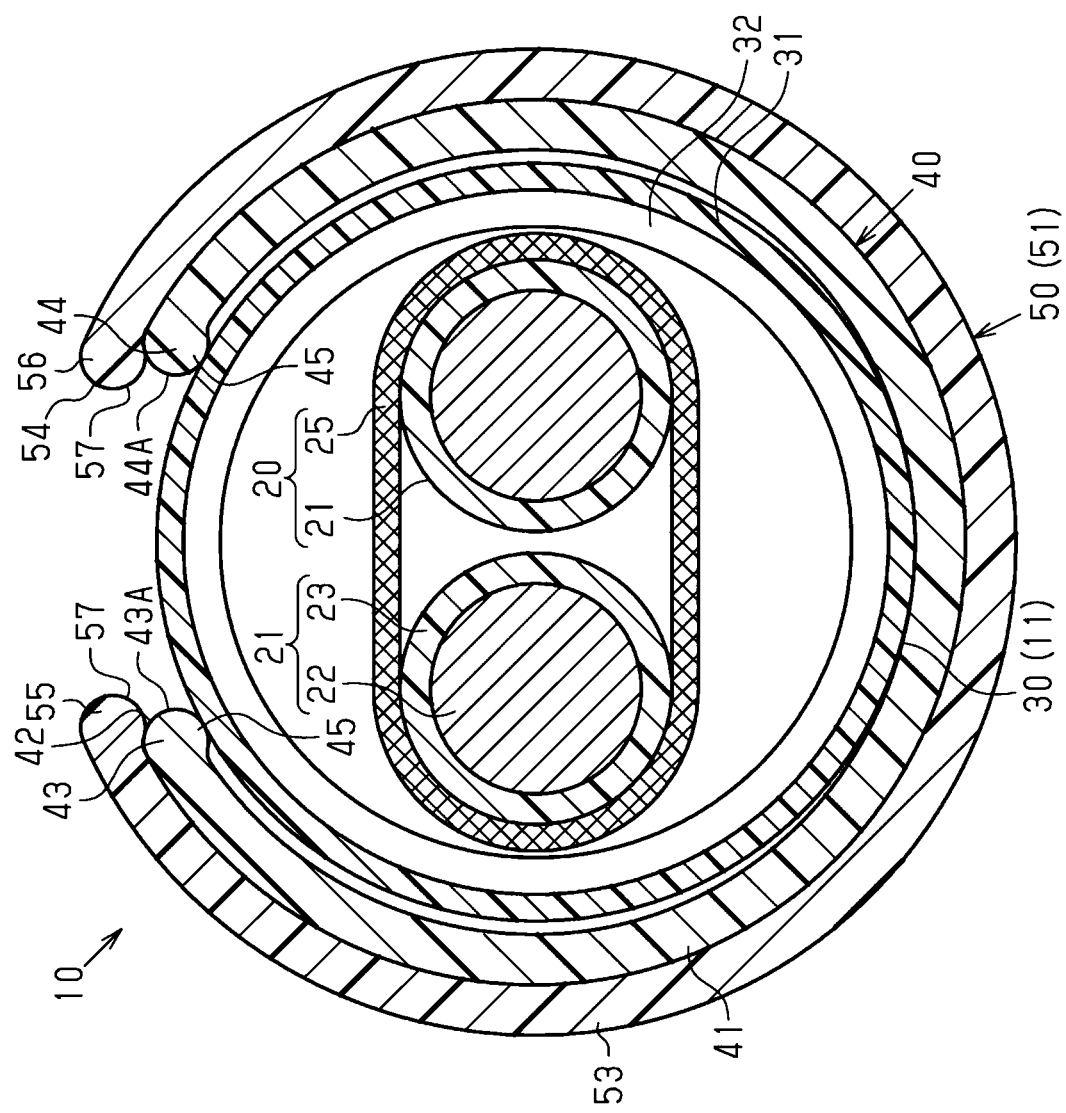
FIG. 8 is a schematic cross-sectional view showing a wire harness according to a modified example.

For example, as shown in FIG. 8, the second path restricting member 50 may be attached to the first path restricting member 40 such that the orientation of the second insertion port 54 coincides with the orientation of the first insertion port 42. In this modification, the first insertion port 42 of the first path restricting member 40 and the second insertion port 54 of the second path restricting member 50 are open in the same radial direction of the exterior member 30 (in the upward direction in the figure). For example, the first insertion port 42 and the second insertion port 54 are aligned in the radial direction of the exterior member 30. Therefore, the outer surface of the exterior member 30 exposed from the first insertion port 42 is also exposed from the second insertion port 54. The second protruding portions 57 of this modification are provided, for example, in the first insertion port 42. The second protruding portions 57 can come into contact with at least one of the first end portion 43 and the second end portion 44 in the circumferential direction of the wire harness main body 11. For example, the second protruding portion 57 provided on the third end portion 55 is in contact with the first end portion 43. The second protruding portion 57 provided on the third end portion 55 is, for example, in contact with the leading end 43A of the first end portion 43. For example, the second protruding portion 57 provided on the fourth end portion 56 is in contact with the second end portion 44. The second protruding portion 57 provided on the fourth end portion 56 is, for example, in contact with the leading end 44A of the second end portion 44. In the configuration shown in FIG. 8, the second protruding portion 57 is not in contact with the outer surface of the exterior member 30. However, the second protruding portion 57 may alternatively be configured to be in contact with the outer surface of the exterior member 30.

According to this configuration, the second protruding portions 57 of the second path restricting member 50 can come into contact with at least one of the first end portion 43 and the second end portion 44, which form the first insertion port 42, in the circumferential direction of the wire harness main body 11. Therefore, the second protruding portions 57 can be engaged with the first end portion 43 or the second end portion 44 in the circumferential direction of the wire harness main body 11. As a result, it is possible to advantageously suppress circumferential rotation of the second path restricting member 50 with respect to the first path restricting member 40.

- The structure of the first path restricting member 40 of the above-described embodiment can be changed as appropriate. For example, as long as the first path restricting member 40 has a first main body portion 41 and a first insertion port 42 and has a structure that can be attached to the outer circumference of the exterior member 30, there is no particular limitation to the other structures.
- In the above-described embodiment, although each support protruding portion 46 is provided in the circumferential direction of the first main body portion 41 where a recess 47 is formed, the present disclosure is not limited to this. For example, the support protruding portions 46 and the recesses 47 may be provided in a staggered arrangement in the circumferential direction of the first main body portion 41.
- In the above-described embodiment, although each support protruding portion 46 is formed so as to extend over the entire length in the lengthwise direction of the first main body portion 41, the present disclosure is not limited to this. For example, each support protruding portion 46 may be partially provided in the lengthwise direction of the first path restricting member 40.
- At least one of the two support protruding portions 46 may be omitted. For example, as shown in FIG. 8, both of the two support protruding portions 46 may be omitted.
- Protruding portions that protrude from the outer surface of the first main body portion 41 to the second path restricting member 50 may be provided. For example, protruding portions may be formed in a way that they can engage with the second protruding portions 57 of the second path restricting member 50 in the circumferential direction of the wire harness main body 11.
- In the above-described embodiment, although each recess 47 is formed so as to extend over the entire length in the lengthwise direction of the first main body portion 41, the present disclosure is not limited to this. For example, each recess 47 may be partially provided in the lengthwise direction of the first main body portion 41.
- At least one of the two recesses 47 may be omitted. For example, as shown in FIG. 8, both of the two recesses 47 may be omitted.
- Each of the first protruding portions 45 may be provided at a position farther from the first insertion port 42 than the leading ends 43A and 44A in the circumferential direction of the first path restricting member 40.
- In the above-described embodiment, although each of the first protruding portions 45 is formed to extend over the entire length in the lengthwise direction of the first main body portion 41, the present disclosure is not limited to this. For example, each of the first protruding portions 45 may be partially provided in the lengthwise direction of the first path restricting member 40.
- At least one of the two first protruding portions 45 may be omitted.
- The thickness in the radial direction of the first main body portion 41 may be changed in the circumferential direction.
- The structure of the third path restricting member 60 of the above-described embodiment can be changed as appropriate as in the first restricting member 40.
- In the above-described embodiment, although the third path restricting member 60 is formed shorter than the first path restricting member 40 in the lengthwise direction of the wire harness main body 11, the present disclosure is not limited to this. For example, the length of the third path restricting member 60 may be the same as or longer than the first path restricting member 40 in the lengthwise direction of the wire harness main body 11.
- In the above-described embodiment, the second path restricting member 50 is attached to the third path restricting member 60 so as to expose a lengthwise portion of the third path restricting member 60 from the second path restricting member 50. However, the present disclosure is not limited to such a configuration. For example, the second path restricting member 50 may be attached to the third path restricting member 60 so as to cover the outer circumference of the third path restricting member 60 over the entire length in the lengthwise direction of the third path restricting member 60.
- In the above embodiment, although the transverse cross-sectional shape of the third path restricting member 60 is the same as the transverse cross-sectional shape of the first path restricting member 40. However, the present disclosure is not limited to such a configuration. For example, the transverse cross-sectional shape of the first path restricting member 40 may be different from the transverse cross-sectional shape of the third path restricting member 60.

In the above embodiment, the third path restricting member 60 serves as an attachment member (attachment) interposed between the inner surface of the second covering portion 52 and the outer surface of the exterior member 30. However, the present disclosure is not limited to this. For example, the attachment member may be embodied in a tape member covering all the way around the outer circumference of the exterior member 30. The tape member of this modification is, for example, repeatedly wrapped around the outer surface of the exterior member 30 until the gap between the inner surface of the second covering portion 52 and the outer surface of the exterior member 30 is filled.

The third path restricting member 60 serving as an attachment member in the above-described embodiment may be omitted.

The structure of the second path restricting member 50 of the above-described embodiment can be changed as appropriate. For example, as long as the second path restricting member 50 has a second main body portion 53 and a second insertion port 54, has a structure that can be attached to the outer circumference of the exterior member 40, and has a structure that can slide along the outer circumference of the first path restricting member 40, there is no particular limitation to the other structures.

Each of the second protruding portions 57 may be provided at a position farther from the second insertion port 54 than the leading ends 55A and 56A in the circumferential direction of the second path restricting member 50.

In the above-described embodiment, although each of the second protruding portions 57 is formed to extend over the entire length in the lengthwise direction of the second main body portion 53, the present disclosure is not limited to this. For example, each of the second protruding portions 57 may be partially provided in the lengthwise direction of the second path restricting member 50.

At least one of the two second protruding portions 57 may be omitted.

The thickness in the radial direction of the second main body portion 53 may be changed in the circumferential direction.

A protruding portion may be provided that protrude from the inner surface of a circumferential intermediate portion of the second main body portion 53 to the first main body portion 41. This protruding portion may be, for example, formed to fit in a recess 47.

In the above-described embodiment, recesses 47 are formed in the outer surface of the first main body portion 41 and second protruding portions 57 are formed on the inner surface of the second main body portion 53 so that the recesses 47 fit over the second protruding portions 57 through recess-protrusion fitting. However, the recesses and the protrusions may be transposed between the main body portions. In that case, for example, protruding portions are formed to protrude from the outer surface of the first main body portion 41, and recesses are formed in the inner surface of the second main body portion 53 to fit over the protruding portions through recess-protrusion fitting.

The first fixing member 71 of the above-described embodiment may be omitted.

The second fixing member 72 of the above-described embodiment may be omitted.

In the above-described embodiment, the third fixing member 73 of the above-described embodiment may be formed so as to fix the second covering portion 52 to the outer circumference of the third path restricting member 60. In that case, a fourth fixing member that fixes the end portion of the third path restricting member 60 exposed from the second path restricting member 50 to the outer circumference of the exterior member 30, may be provided separately from the third fixing member 73.

The third fixing member 73 of the above-described embodiment may be omitted.

In the above-described embodiment, the first path restricting member 40, the second path restricting member 50, and the third path restricting member 60 are more rigid than the exterior member 30, but the present disclosure is not limited to this, and the hardness may be less than or equal to that of the exterior member 30. That is, the first path restricting member 40, the second path restricting member 50, and the third path restricting member 60 need not be more rigid than the exterior member 30 if the first path restricting member 40, the second path restricting member 50, and the third path restricting member 60 serve to make the wire harness main body 11 less likely to bend than the wire harness main body 11 without these restricting members attached thereto.

For example, the exterior member 30 may be a resin corrugated tube with an outer surface on which a metal layer that contains a metal material is formed.

The exterior member 30 is not limited to being a corrugated tube, and may be an exterior member without any ring-shaped protrusions 31 or ring-shaped recesses 32, for example.

The exterior member 30 may have a slit that extends in the lengthwise direction of the exterior member 30.

Although the electric wires 21 are high-voltage electric wires, the present disclosure is not limited to such a configuration. For example, the electric wires 21 may be low-voltage electric wires.

In the electric wire member 20 of the above-described embodiment, an electromagnetic shield member is embodied as the braided member 25. However, the present disclosure is not limited to such a configuration. For example, the electromagnetic shield member may be embodied as a metal foil.

The braided member 25 of the electric wire member 20 may be omitted.

The number of electric wires 21 included in the electric wire member 20 is two. However, the present disclosure is not limited to such a configuration. The number of electric wires 21 may be one or three or more.

The positional relationship between the inverter M1 and the high-voltage battery M2 in the vehicle V is not limited to that in the above-described embodiment, and may be changed as appropriate depending on the vehicle configuration.

A plurality of on-board devices to which the wire harness 10 is to be electrically connected are embodied as the inverter M1 and the high-voltage battery M2. However, the present disclosure is not limited to such a configuration. The plurality of on-board devices to which the wire harness 10 is to be electrically connected are not particularly limited as long as they are electric devices to be mounted in the vehicle V.

The embodiments disclosed herein are illustrative in all aspects and should not be considered restrictive. The scope of the present disclosure is indicated by the scope of claims, not the above-mentioned meaning, and is intended to include all modifications within the meaning and scope equivalent to the scope of claims.

What is claimed is:

1. A wire harness comprising:
   a wire harness main body including an electric wire and an exterior tube enclosing an outer circumference of the electric wire;
   a first path restricting cover that is attached to an outer circumference of the exterior tube and restricts a path of the wire harness main body;
   a second path restricting cover that is attached to an outer circumference of the first path restricting cover and restricts the path of the wire harness main body, wherein:
      the second path restricting cover covers the outer circumference of a portion in a lengthwise direction of the first path restricting cover, and covers the outer circumference of the exterior tube that is displaced from the first path restricting cover in a lengthwise direction of the wire harness main body and is exposed from the first path restricting cover,
      the first path restricting cover includes a first main body that covers a portion of the outer circumference of the exterior tube, and a first insertion port that is open in a direction orthogonal to a lengthwise direction of the first main body and extends along an entire length in the lengthwise direction of the first main body,
      the second path restricting cover includes a second main body that covers a portion of the outer circumference of the first path restricting cover and a portion of the outer circumference of the exterior tube, and a second insertion port that is open in a direction orthogonal to a lengthwise direction of the second main body and extends along an entire length in the lengthwise direction of the second main body, and
      the second path restricting cover is configured to slide along the outer circumference of the first path restricting cover in the lengthwise direction of the wire harness main body;
   an attachment that is provided spaced apart from the first path restricting cover in the lengthwise direction of the wire harness main body and is attached to the outer circumference of the exterior tube, wherein:
      the second path restricting cover extends from one end in the lengthwise direction of the first path restricting cover to the attachment, and
      the second path restricting cover includes a first covering portion that covers the outer circumference of the first path restricting cover and a second covering portion that covers an outer circumference of the attachment;
   a first fixing member that fixes the first covering portion of the second path restricting cover to the outer circumference of the first path restricting cover;
   a second fixing member that fixes, to the outer circumference of the exterior tube, an end in the lengthwise direction of the first path restricting cover that is exposed from the second path restricting cover; and
   a third fixing member that fixes the second covering portion of the second path restricting cover to the outer circumference of the exterior tube.

2. The wire harness according to claim 1, wherein the attachment is a third path restricting cover that has a same transverse cross-sectional shape as the first path restricting cover.

3. The wire harness according to claim 1, wherein the attachment is shorter than the first path restricting cover in the lengthwise direction of the wire harness main body.

4. The wire harness according to claim 1, wherein:
   the first path restricting cover includes:
      a first end and a second end that are two ends in a circumferential direction of the first main body and form the first insertion port; and
      a first protrusion that protrudes from an inner surface of at least one of the first end and the second end and is able to come into contact with an outer surface of the exterior tube, and
   the second path restricting cover includes:
      a third end and a fourth end that are two ends in a circumferential direction of the second main body and form the second insertion port; and
      a second protrusion that protrudes from an inner surface of at least one of the third end and the fourth end and is configured to come into contact with an outer surface of the first path restricting cover.

5. The wire harness according to claim 4, wherein:
   the second path restricting cover is attached to the outer circumference of the first path restricting cover such that an orientation of the second insertion port is different from an orientation of the first insertion port,
   the first path restricting cover includes a recess recessed from an outer surface of the first main body, and
   the second protrusion is configured to fit in the recess through a recess-protrusion fitting, and is configured to engage with the recess in a circumferential direction of the wire harness main body.

6. The wire harness according to claim 4, wherein:
   the second path restricting cover is attached to the outer circumference of the first path restricting cover such that an orientation of the second insertion port coincides with an orientation of the first insertion port, and
   the second protrusion is provided in the first insertion port and is configured to come into contact with at least one of the first end and the second end in a circumferential direction of the wire harness main body.

* * * * *